(12) United States Patent
Ichinose (10) Patent No.: US 10,655,379 B2
(45) Date of Patent: May 19, 2020

(54) OPENING AND CLOSING SYSTEM

(71) Applicant: MITSUI KINZOKU ACT CORPORATION, Yokohama-shi, Kanagawa (JP)

(72) Inventor: Mikio Ichinose, Yokohama (JP)

(73) Assignee: MITSUI KINZOKU ACT CORPORATION, Yokohama-Shi, Kanagawa (JP)

( * ) Notice: Subject to any disclaimer, the term of this patent is extended or adjusted under 35 U.S.C. 154(b) by 149 days.

(21) Appl. No.: 15/648,782

(22) Filed: Jul. 13, 2017

(65) Prior Publication Data

US 2018/0016835 A1 Jan. 18, 2018

(30) Foreign Application Priority Data

Jul. 14, 2016 (JP) .................................. 2016-139624

(51) Int. Cl.
*E05F 15/73* (2015.01)
*B60J 5/04* (2006.01)

(52) U.S. Cl.
CPC ............. *E05F 15/73* (2015.01); *B60J 5/0472* (2013.01); *E05F 2015/767* (2015.01); *E05Y 2400/44* (2013.01); *E05Y 2900/50* (2013.01); *E05Y 2900/531* (2013.01)

(58) Field of Classification Search
USPC .......................... 49/25, 27, 28, 333, 334, 31
See application file for complete search history.

(56) References Cited

U.S. PATENT DOCUMENTS

| | | | | |
|---|---|---|---|---|
| 7,175,227 B2* | 2/2007 | Menard | ................... | E05F 15/43 296/146.1 |
| 7,530,198 B2* | 5/2009 | Matsuyama | ............ | E05F 15/43 49/27 |
| 7,810,864 B2* | 10/2010 | Shimizu | .................. | E05F 15/46 296/146.4 |
| 8,615,927 B2* | 12/2013 | Ezzat | ..................... | G01V 15/00 200/61.43 |

(Continued)

FOREIGN PATENT DOCUMENTS

JP 05-113088 A 5/1993
JP 2009-221652 A 10/2009

(Continued)

OTHER PUBLICATIONS

Japanese Office Action dated Feb. 5, 2019 in corresponding application No. 2016-139624.

(Continued)

*Primary Examiner* — Brian D Mattei
(74) *Attorney, Agent, or Firm* — Foley & Lardner LLP (57) ABSTRACT

An opening and closing system includes a drive unit which drives a closing openable member of a vehicle to be opened or closed, an opening and closing control unit which controls the drive unit to open or close the closing openable member, an image capturing unit which captures an image of a periphery of the closing openable member, and a detecting unit which detects an obstacle proximity to the closing openable member based on an image captured by the image capturing unit. When the detecting unit detects an obstacle, the opening and closing unit stops the closing openable member before it comes into contact with the obstacle.

14 Claims, 10 Drawing Sheets

(56) References Cited

U.S. PATENT DOCUMENTS

| | | | |
|---|---|---|---|
| 8,635,809 B2* | 1/2014 | Wuerstlein | E05F 15/46 296/146.9 |
| 8,766,626 B2* | 7/2014 | Pellegrini | E05F 15/63 296/146.4 |
| 2006/0162254 A1* | 7/2006 | Imai | E05F 15/73 49/26 |
| 2008/0211519 A1* | 9/2008 | Kurumado | G01D 5/24 324/688 |
| 2009/0000196 A1 | 1/2009 | Kollar et al. | |
| 2009/0229183 A1 | 9/2009 | Kamiya | |
| 2011/0295469 A1* | 12/2011 | Rafii | E05F 15/43 701/49 |
| 2011/0298899 A1* | 12/2011 | Masuda | G03B 35/08 348/47 |
| 2013/0182906 A1* | 7/2013 | Kojo | G01S 11/12 382/103 |
| 2013/0186001 A1* | 7/2013 | Cui | E06B 9/68 49/31 |

FOREIGN PATENT DOCUMENTS

| | | |
|---|---|---|
| JP | 2009-221797 A | 10/2009 |
| JP | 2009-299387 A | 12/2009 |
| JP | 2010-236329 A | 10/2010 |
| JP | 2014-194123 A | 10/2014 |
| JP | 2015-010331 A | 1/2015 |
| JP | 2015-031108 A | 2/2015 |

OTHER PUBLICATIONS

JP Office Action issued in the corresponding Japanese Patent Application Ser. No. 2016-139624, dated Jun. 11, 2019.

* cited by examiner

OPENING AND CLOSING SYSTEM

This application claims priority from Japanese Patent Application No. 2016-139624, filed on Jul. 14, 2016, the entire subject-matter of which is incorporated herein by reference.

BACKGROUND

1. Technical Field

The disclosure relates to an opening and closing system for automatically opening and closing a closing openable member such as a door of a vehicle.

2. Description of the Related Art

There are known vehicles in which a closing openable member such as a door is driven to be automatically opened and closed by a motor. However, if an obstacle exists on an opening and closing track of the closing openable member, there may be fears that the closing openable member is brought into contact with the obstacle and the obstacle is caught between the closing openable member and the vehicle body when the closing openable member is closed. Thus, there have been proposed an apparatus which detects an obstacle to avoid a contact between a closing openable member and the obstacle (For example, refer to JP-A-2015-31108 and JP-A-2014-194123).

A catching detecting device described in JP-A-2015-31108 monitors an electric current, which flows to a motor for driving a door, and detects catching of an obstacle based on an increase amount of electric current flowing to the motor. In addition, an obstacle detecting device described in JP-A-2014-194123 detects an obstacle based on a change in an electrostatic capacity formed on a periphery of a closing openable member and stops the driving of the closing openable member when the obstacle is detected.

In the catching detecting device described in JP-A-2015-31108, the catching of the obstacle is detected based on the increase amount of electric current which flows to the motor. Then, the electric current flowing to the motor increases as a result of the closing openable member being prevented from being opened or closed by the obstacle with which the closing openable member is brought into contact. Owing to this, the contact of the closing openable member with the obstacle cannot be avoided in advance.

In the obstacle detecting device described in JP-A-2014-194123, the obstacle is detected based on the change in the electrostatic capacity formed on the periphery of the closing openable member. Then, the electrostatic capacity formed relates to a distance between the closing openable member and the obstacle, and therefore, the obstacle can be detected before the obstacle is brought into contact with the closing openable member, whereby the contact of the closing openable member with the obstacle can be avoided in advance. However, the electrostatic capacity is easy to be influenced by an object lying on the periphery of the obstacle to be detected, so that there may be concerned about a deterioration of detection accuracy of the obstacle.

SUMMARY

Illustrative aspects of the invention provide an opening and closing system configured to detect an obstacle to be detected before a closing openable member is brought into contact with the obstacle without being influenced by an object lying on the periphery of the obstacle, so as to avoid a contact of the closing openable member with the obstacle in advance.

According to one aspect of the invention, there may be provided an opening and closing system, comprising: a drive unit configured to drive a closing openable member to be opened or closed, the closing openable member being provided in an opening portion of a vehicle; an opening and closing control unit configured to control the drive unit to open or close the closing openable member; an image capturing unit configured to capture an image of a periphery of the closing openable member; and a detecting unit configured to detect an obstacle proximity to the closing openable member based on an image captured by the image capturing unit, wherein in response to the obstacle being detected by the detecting unit, the opening and closing control unit is configured to stop the closing openable member before the closing openable member comes into contact with the obstacle.

According thereto, it is possible to provide the opening and closing system which can detect the obstacle to be detected before the closing openable member comes into contact with the obstacle without being influenced by the object lying on the periphery of the obstacle, so as to avoid the contact of the closing openable member with the obstacle in advance.

DETAILED DESCRIPTION

Figure 1:
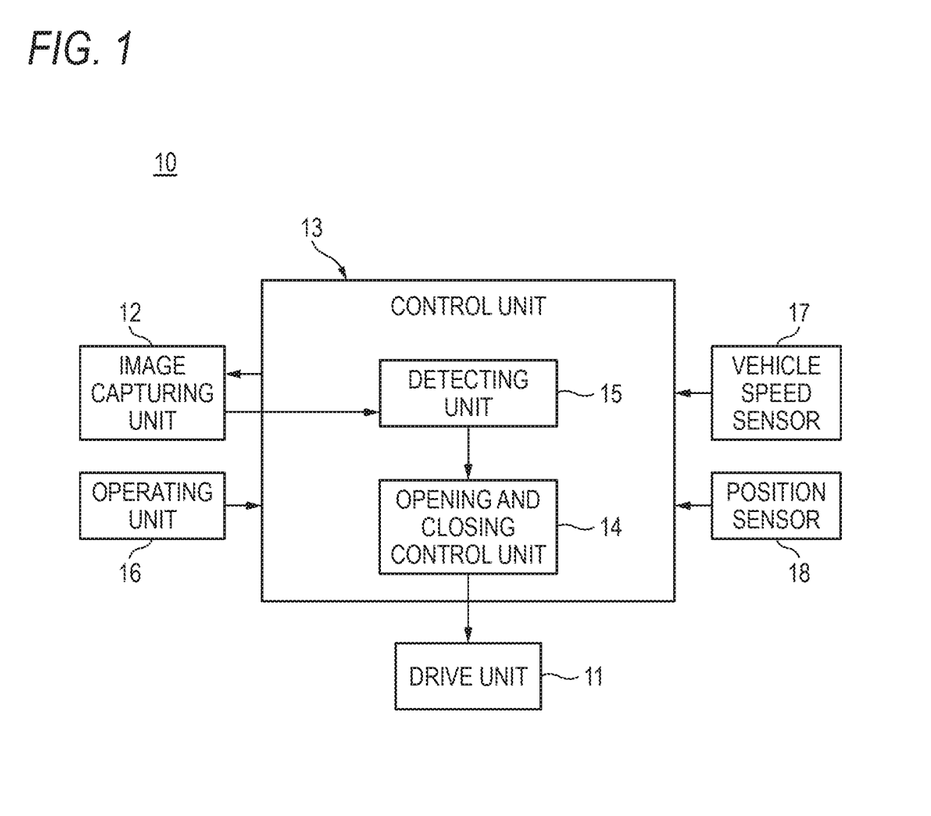
FIG. 1 is a functional block diagram showing an example of an opening and closing system to describe an illustrative embodiment of the invention.
Figure 2:
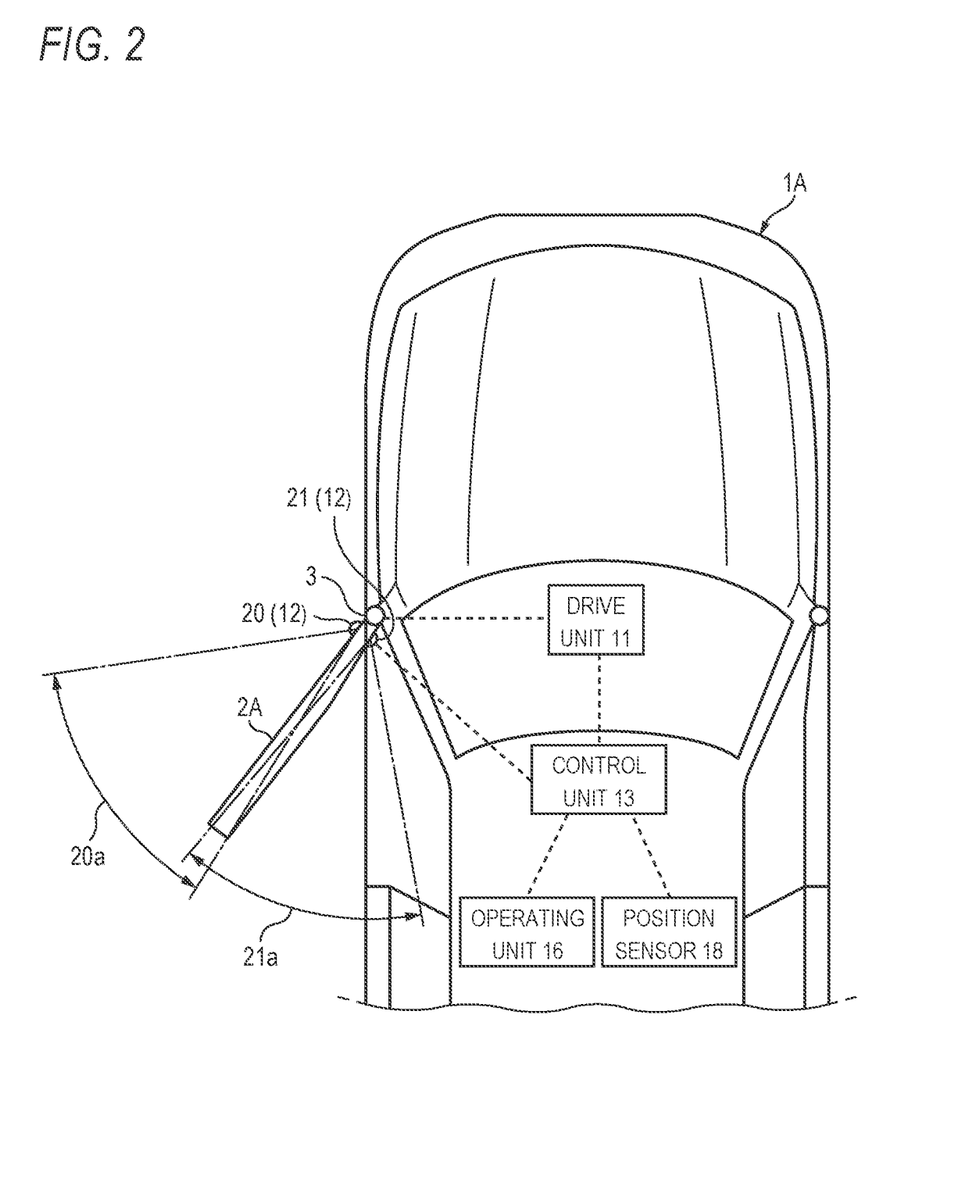
FIG. 2 is a schematic diagram showing an example of a vehicle to which the opening and closing system shown in FIG. 1 is installed.

FIG. 1 shows a functional block diagram showing an example of an opening and closing system to describe an illustrative embodiment of the invention, and FIG. 2 shows a schematic diagram showing an example of a vehicle to which the opening and closing system shown in FIG. 1 is installed.

An opening and closing system 10 is installed to a so-called sedan type vehicle 1A. The opening and closing system 10 is configured to automatically open and close a door 2A that is a closing openable member of the vehicle 1A.

The door which is to be opened and closed automatically by the opening and closing system 10 includes a driver's side door, a front passenger's side door and rear side doors. In this illustrative embodiment, the configuration of the opening and closing system 10 will be described as being exemplified in connection with the front passenger's side door. In this illustrative embodiment, the door 2A is a so-called swing door which is supported so as to swing or rotate on a door frame (an opening portion) of the vehicle by means of a hinge 3.

The opening and closing system 10 includes a drive unit 11, a capturing unit 12 and a control unit 13. The drive unit 11 includes a motor, or the like, and drives the door 2A to be opened or closed. The image capturing unit 12 captures an image of a periphery of the door 2A. Incidentally, the control unit 13 is one example of a controller.

The image capturing unit 12 is configured by one or a plurality of cameras. In the example shown in FIG. 2, the image capturing unit 12 includes a camera 20, which is set on an outer side of the door 2A in the vicinity of the hinge 3, and a camera 21, which is set on an inner side of the door 2A also in the vicinity of the hinge 3. An opening track of the door 2A is included in a field of view 20a of the camera 20, and a closing track of the door 2A is included in a field of view 21a of the camera 21. The number of cameras and the setting locations thereof are not particularly limited as long as the periphery of the door 2A including the opening track and the closing track can be imaged.

The control unit 13 is mainly configured by one or a plurality of processors. The control unit 13 includes storage media such as a ROM (Read Only Memory) and a RAM (Random Access Memory) which stores control programs which are to be executed by the processors and the results of operations performed by the processors. The control unit 13 operates according to the control programs and functions as an opening and closing control unit 14 and a detecting unit 15. The opening and closing control unit 14 controls the drive unit 11 to open or close the door 2A. The detecting unit 15 detects an obstacle which moves toward the door 2A on the track of the door 2A.

The opening and closing control unit 14 controls the drive unit 11 according to an operation inputted into an operating unit 16 to open or close the door 2A. The operating unit 16 may be made up of a switch, for example. When an obstacle is proximity to the door 2A on the track of the door 2A is detected by the detecting unit 15, the opening and closing control unit 14 stops the door 2A before the door 2A is brought into contact with the obstacle. The detecting unit 15 detects the obstacle proximity to the door 2A on the track of the door 2A, based on an image of the periphery of the door 2A captured by the image capturing unit 12.

The control unit 13 is electrically connected to a vehicle speed sensor 17 and an opening or position sensor 18. The vehicle speed sensor 17 detects a speed of the vehicle 1A. The opening or position sensor 18 detects a degree of opening or position of the door 2A. A vehicle speed signal and a position signal are inputted into the control unit 13 from the vehicle speed sensor 17 and the position sensor 18, respectively.

Figure 3:
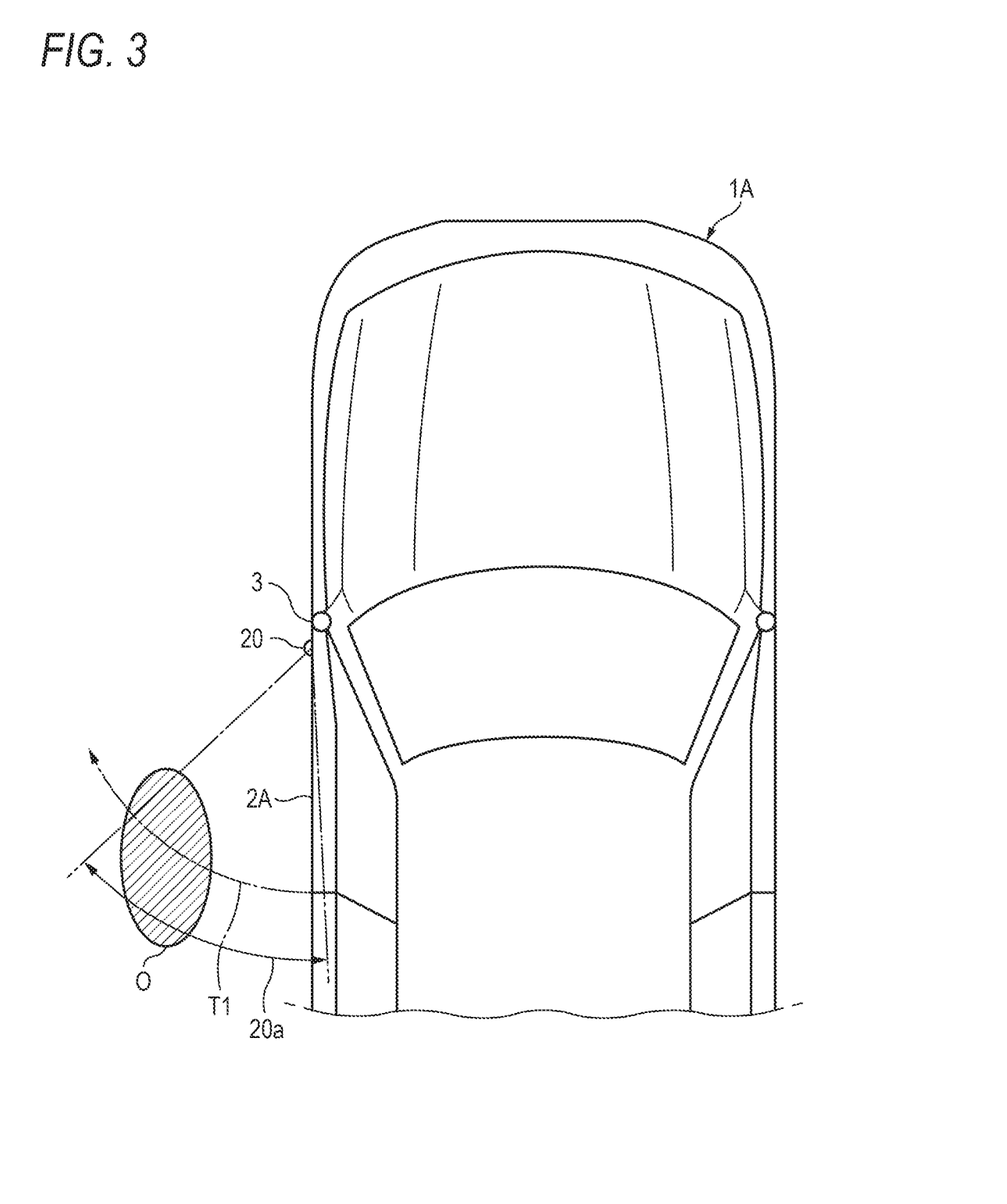
FIG. 3 is a schematic diagram showing an example of a door opening operation carried out on the vehicle shown in FIG. 2 by the opening and closing system.
Figure 4:
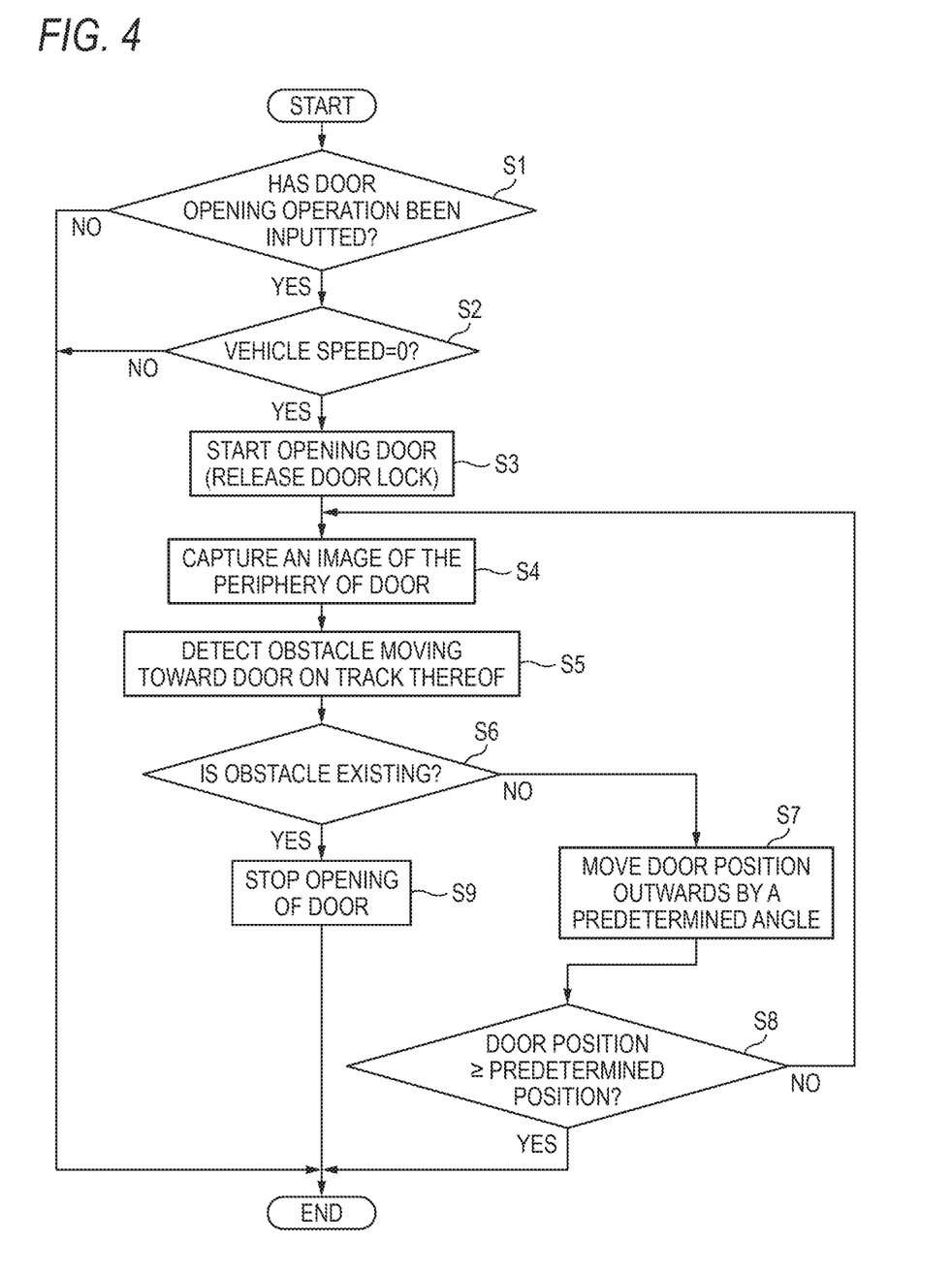
FIG. 4 is a flowchart of the door opening operation by the opening and closing system shown in FIG. 1.

FIGS. 3 and 4 show operations performed by the opening and closing system 10 when the door 2A is opened.

In the example shown in FIG. 3, an obstacle O exists on an opening track T1 of the door 2A. The periphery of the door 2A including the obstacle O is imaged by the camera 20 on the outer side of the image capturing unit 12. A passenger who is getting into the vehicle 1A, a vehicle parked next to the vehicle 1A, a curb at an edge of a road and the like can be the obstacle O, for example. Nevertheless, the obstacle O is not limited thereto.

The control unit 13 determines whether or not an opening operation of the door 2A is inputted into the operating unit 16 (step S1). When the control unit 13 determines that the door opening operation has been inputted into the operating unit 16, the control unit 13 determines whether or not the vehicle 1A is at a halt (vehicle speed=0) based on the vehicle speed signal inputted from the vehicle speed sensor 17 (step S2).

When the control unit 13 determines in step S2 that the vehicle speed=0, the control unit 13 starts opening the door 2A (step S3). The control unit 13 is configured to control a latch device. The latch device is configured to lock the door 2A so as not to be opened. When starting opening the door 2A, the control unit 13 outputs an unlocking control signal to the latch device to unlock the door 2A.

After having started opening the door 2A, the control unit 13 outputs an image capture control signal to the image capturing unit 12 to cause the image capturing unit 12 to capture an image of the periphery of the door 2A (step S4). Then, the detecting unit 15 of the control unit 13 detects an obstacle, which is proximity to the door 2A on the track of the door 2A, based on the image of the periphery of the door 2A having been captured by the image capturing unit 12 (step S5).

As an example of a detection method of an obstacle, an object is extracted from the image through image analysis such as edge detection, and a direction of and a distance to the object based on the position of the camera are calculated. Then, whether or not the object is positioned on the track of the door 2A is determined from a positional relationship between the camera and the door 2A by using the direction of the distance to the object calculated, and a distance between the object and the door 2A is calculated when it is determined that the object is positioned on the track of the door 2A. In a case where the object is positioned on the track of the door 2A and the distance between the object and the door 2A is less than a predetermined threshold, this object is detected as an obstacle which is proximity to the door 2A on the track of the door 2A.

The distance to the object based on the position of the camera may be calculated from a parallax image of the object captured by the use of, for example, a stereocamera by using the principle of trigonometrical survey. When the camera is set on the door 2A and is moved in accordance with opening and closing of the door 2A, a monocular camera may also be used. In this case, a distance to the object may be calculated based on the movement of the object on continuous images captured at minute time intervals and the displacement of the monocular camera. The threshold in relation to the distance may be set as required in consideration of the speed of the door 2A, which is driven to be opened or closed by the drive unit 11, and a braking force of the drive unit 11 to an extent that the door 2A can be stopped before the door 2A is brought into contact with the obstacle when the obstacle proximity to the door 2A on the track of the door 2A is detected.

If no obstacle is detected by the detecting unit 15 (step S6: No), the opening and closing control unit 14 of the control unit 13 outputs a door opening control signal to the drive unit 11 to move the position of the door 2A further outwards by a predetermined angle and opens the door 2A so (step S7).

Subsequently, the control unit 13 determines whether or not the position of the door 2A has reached a set (maximum outward) position in the automatic door opening (step S8)

based on a position signal inputted from the position sensor 18. As a result of the determination made in step S8, when the control unit 13 determines that the position of the door 2A has reached the set position (step S8: Yes), the control unit 13 ends the door opening operation. On the other hand, when the control unit 13 determines that the position of the door 2A has not yet reached the set position (step S8: No), the control unit 13 returns to step S4, in which the control unit 13 causes the image capturing unit 12 to capture an image of the periphery of the door 2A, and executes the operations from step S4 to step S8 repeatedly.

On the other hand, when an obstacle is detected by the detecting unit 15 (step S6: Yes), the opening and closing control unit 14 of the control unit 13 outputs a stop control signal to the drive unit 11 to stop the opening of the door 2A and to hold the position of the door 2A (step S9) and ends the opening operation.

By performing the above-described door opening operation, in a case where the obstacle exists on the opening track of the door 2A, the door 2A is stopped before the door 2A comes into contact with the obstacle. Thus, it is possible to avoid not only the contact of the door 2A with the obstacle but also the damage made to both the door 2A and the obstacle by the contact. Further, since the door 2A is opened to such an extent that the door 2A does not come into contact with the obstacle, the passenger will find an enhanced ease.

Figure 5:
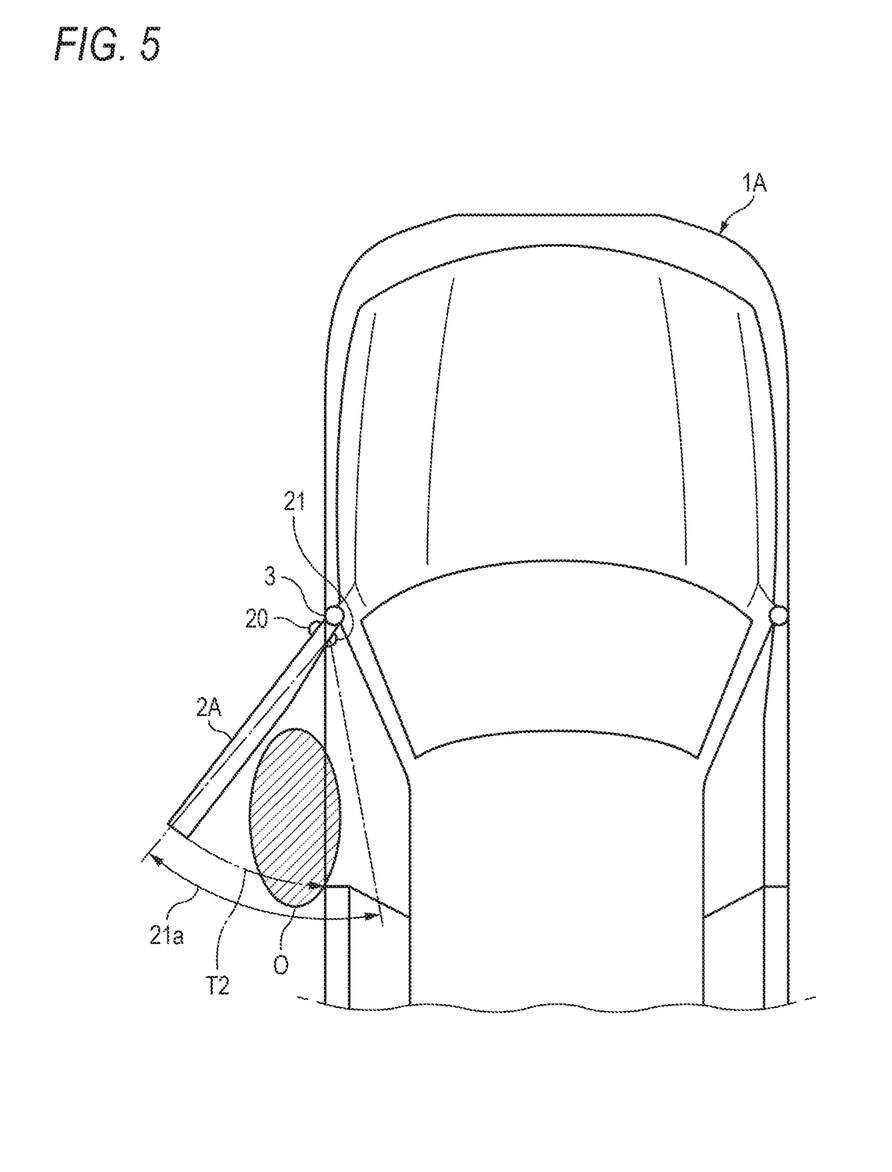
FIG. 5 is a schematic diagram showing an example of a door closing operation carried out on the vehicle shown in FIG. 2 by the opening and closing system.
Figure 6:
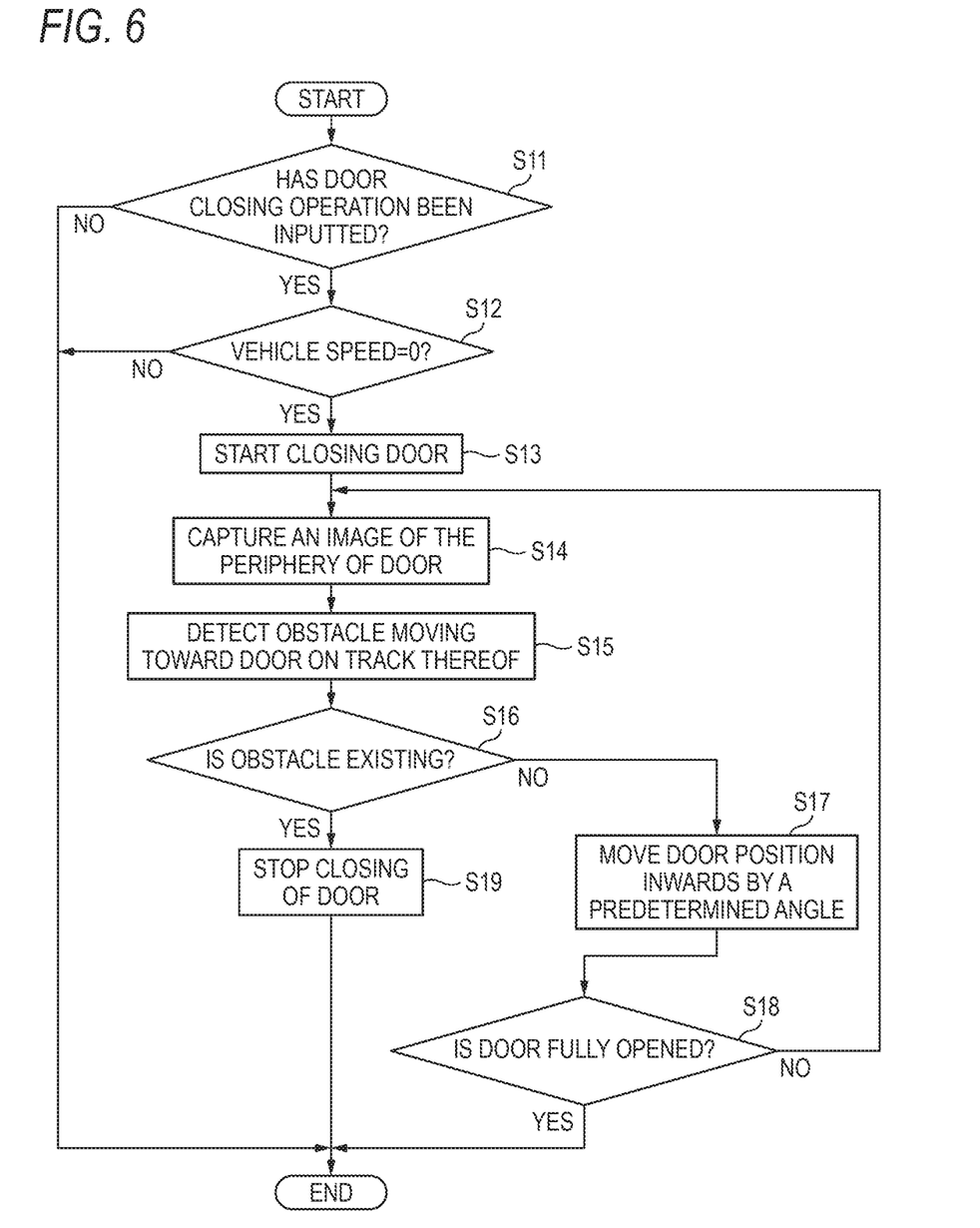
FIG. 6 is a flowchart of the door opening operation by the opening and closing system shown in FIG. 1.

FIGS. 5 and 6 show an operation performed by the opening and closing system 10 when the door 2A is closed.

In an example shown in FIG. 5, an obstacle O exists on a closing track T2 of the door 2A. The periphery of the door 2A including the obstacle O is imaged by the camera 21, which is disposed on the inner side of the door 2A, of the image capturing unit 12. The passenger who is getting into the vehicle 1A, belongings such as a bag carried by the passenger and the clothes of the passenger can be raised as examples of the obstacle O. Nevertheless, the belongings are not limited thereto.

The control unit 13 determines whether or not a closing operation of the door 2A is inputted into the operating unit 16 (step S11). When the control unit 13 determines that the closing operation of the door 2A is inputted into the operating unit 16, the control unit 13 then determines whether or not the vehicle 1A is at a halt (the vehicle speed=0) based on a vehicle speed signal inputted from the vehicle speed sensor 17 (step S12). When the control unit 13 determines that the vehicle speed=0 in step S12, the control unit 13 starts closing the door 2A (step S13).

After having started closing the door 2A, the control unit 13 outputs an image capture control signal to the image capturing unit 12, so as to cause the image capturing unit 12 to capture an image of the periphery of the door 2A (step S14). Then, the detecting unit 15 of the control unit 13 detects an obstacle proximity to the door 2A on the closing track of the door 2A, based on the image of the periphery of the door 2A captured by the image capturing unit 12 (step S15).

When no obstacle is detected by the detecting unit 15 (step S16: No), the opening and closing control unit 14 of the control unit 13 outputs a door closing control signal to the drive unit 11 to move the position of the door 2A inwards by a predetermined angle and closes the door 2A (step S17).

Subsequently, the control unit 13 determines whether or not the door 2A is fully closed (step S18) based on a position signal inputted from the position sensor 18. When the control unit 13 determines in step S18 that the door 2A is fully closed (step S18: Yes), the control unit 13 ends the door closing operation. On the other hand, when the control unit 13 determines that the door 2A is not fully closed (step S18: No), the control unit 13 returns to step S14, in which the control unit 13 causes the image capturing unit 12 to capture an image of the periphery of the door 2A, and executes the operations from step S14 to step S18 repeatedly.

On the other hand, when the detecting unit 15 detects an obstacle (step S16: Yes), the opening and closing control unit 14 of the control unit 13 outputs a stop control signal to the drive unit 11 to stop the closing of the door 2A and to hold the position of the door 2A (step S19) and ends the door closing operation.

According to the above-described door closing operation, if the obstacle is lying on the closing track of the door 2A, the door 2A is stopped moving before the door 2A comes into contact with the obstacle, so that it can be possible to avoid the contact of the door 2A with the obstacle in advance, and to avoid the catching of the obstacle between the door 2A and a door frame in advance. Further, the damage both to the door 2A and the obstacle due to the contact of the door 2A with the obstacle or the catching of the obstacle between the door 2A and the door frame can be avoided in advance.

Thus, according to the above-described opening and closing system 10, the obstacle lying on the track of the door 2A is detected based on the captured image of the periphery of the door 2A. According to the detection based on the captured image, compared with the detection based on the change in electrostatic capacity, it is possible to suppress the deterioration of the detection accuracy attributed to the object lying on the periphery of the obstacle. This enables the obstacle proximity to the door 2A on the track of the door 2A to be detected with good accuracy to thereby suppress the erroneous operation of the opening and closing system 10 which would otherwise be caused by an error in detecting the obstacle. Therefore, it becomes possible not only to enhance the ease with which the opening and closing system 10 is used but also to avoid the contact of the door 2A with the obstacle in advance.

Incidentally, in the door opening operation shown in FIG. 4, it has been described that, when the obstacle proximity to the door 2A on the track of the door 2A is detected, the control unit 13 stops the door 2A to hold the position of the door 2A. Alternatively, the control unit 13 may be configured to cause the door 2A to move in an opposite direction to the direction in which the door 2A moved before the door 2A was stopped, that is, the control unit 13 may be configured to close the door 2A. According thereto, it is possible to avoid the contact of the door 2A with the obstacle in an ensured fashion by suppressing the overshoot of the door 2A. The amount by which the door 2A is caused to move inwards when the door 2A is closed can be set as required.

Similarly, in the door closing operation shown in FIG. 6, after the door 2A is stopped, the control unit 13 may cause the door 2A to move in a direction (e.g., second direction) that is opposite to the direction in which the door 2A moved before the door 2A was stopped (e.g., first direction), that is, the control unit 13 may close the door 2A. According thereto, it is possible to avoid not only the contact of the door 2A with the obstacle but also the catching of the obstacle between the door 2A and the door frame in an ensured fashion by suppressing the overshoot of the door 2A. The amount by which the door 2A is caused to move outwards when the door 2A is opened can be set as required. The door 2A may be made to be fully opened.

The door opening and closing system 10 has been described heretofore as opening and closing the door 2A that is the swing door. Alternatively, the opening and closing system 10 can also be used to open and close a sliding door that is opened and closed along the vehicle body.

Figure 7:
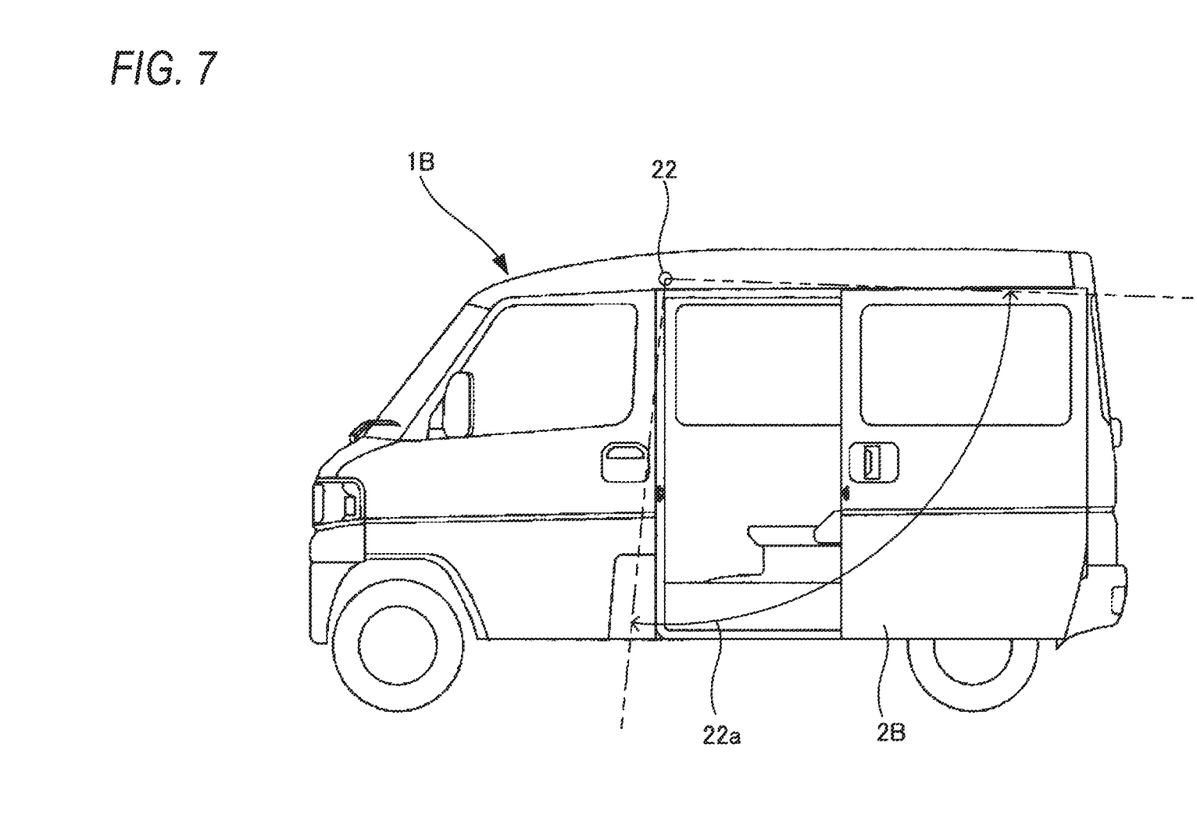
FIG. 7 is a schematic diagram showing an example of a different type of vehicle to which the opening and closing system shown in FIG. 1 is installed.

In an example shown in FIG. 7, the opening and closing system 10 is installed to a vehicle 1B that is an one box type passenger vehicle, and a door 2B that is automatically opened and closed by the opening and closing system 10 is a sliding side door for a rear seat. The image capturing unit 12 is configured by a camera 22 that is set on an edge portion of a roof outer panel configuring a part of a door frame. An opening track and a closing track of the door 2B are both included in a field of view 22a of the camera 22. Other configurations of the opening and closing system 10 are similar to those shown in FIG. 1. A door opening operation and a door closing operation carried out by the opening and closing system 10 are similar to those shown in FIGS. 4 and 6. The number of cameras and the setting locations thereof are not particularly limited, as long as the periphery of the door 2B including the opening track and the closing track can be imaged. For example, the camera 22 may be set on an edge portion of a roof inner panel which makes up part of the door frame. Alternatively, cameras 22 may be set individually both on the edge portion of the roof outer panel and the edge portion of the roof inner panel.

In this example, when the door 2B is opened by the opening and closing system 10, when there exists an obstacle proximity to the door 2B on the opening track of the door 2B, the door 2B is stopped before the door 2B comes into contact with the obstacle. Therefore, the contact of the door 2B with the obstacle and the damage made both to the door 2B and the obstacle as a result of the contact are avoided in advance, and the door 2B is opened to such an extent that the door 2B does not come into contact with the obstacle. Thus, the passenger will find an enhanced ease.

Figure 8:
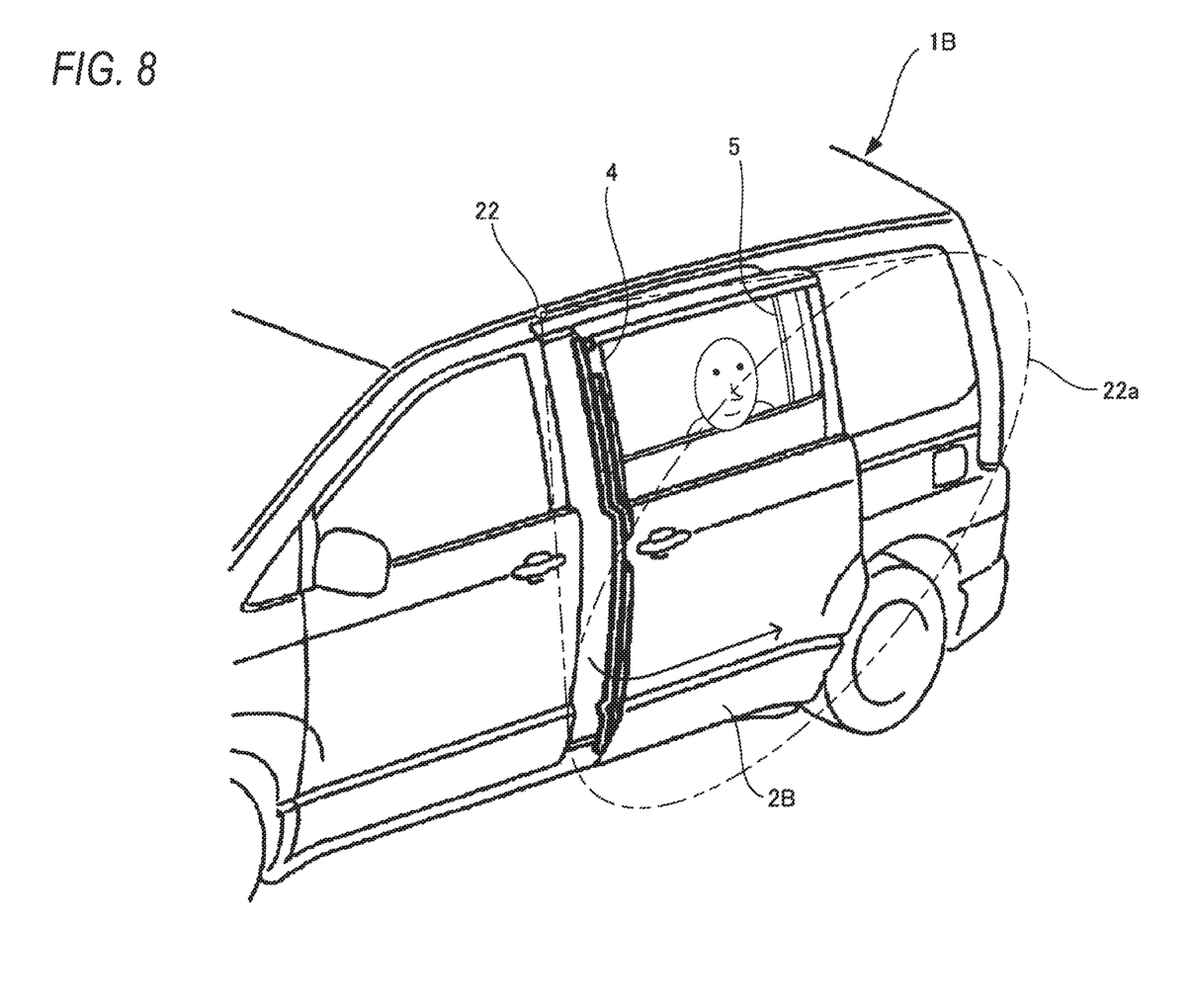
FIG. 8 is a schematic diagram showing an example of a door opening operation carried out on the vehicle shown in FIG. 7 by the opening and closing system.

Specifically, in the sliding door, as shown in FIG. 8, if the door 2B is opened with a hand or head portion of a passenger put out of an opened window of the door 2B, there may be a risk that the passenger being caught between a window frame 4 of the door 2B and a door frame 5. Also in this case, the hand or head portion of the passenger is detected as an obstacle existing on the track of the door 2B, and the door 2B is stopped before the door 2B comes into contact with the obstacle.

Further, when the door 2B is closed by the opening and closing system 10, even in a case where there exists an obstacle proximity to the door 2B on the track of the door 2B, the door 2B is stopped before the door 2B comes into contact with the obstacle. Therefore, not only the contact of the door 2B with the obstacle but also the catching of the obstacle between the door 2B and the door frame can be avoided in advance, the damage made to both the door 2B and the obstacle by the contact or catching being thereby avoided in advance.

Figure 9:
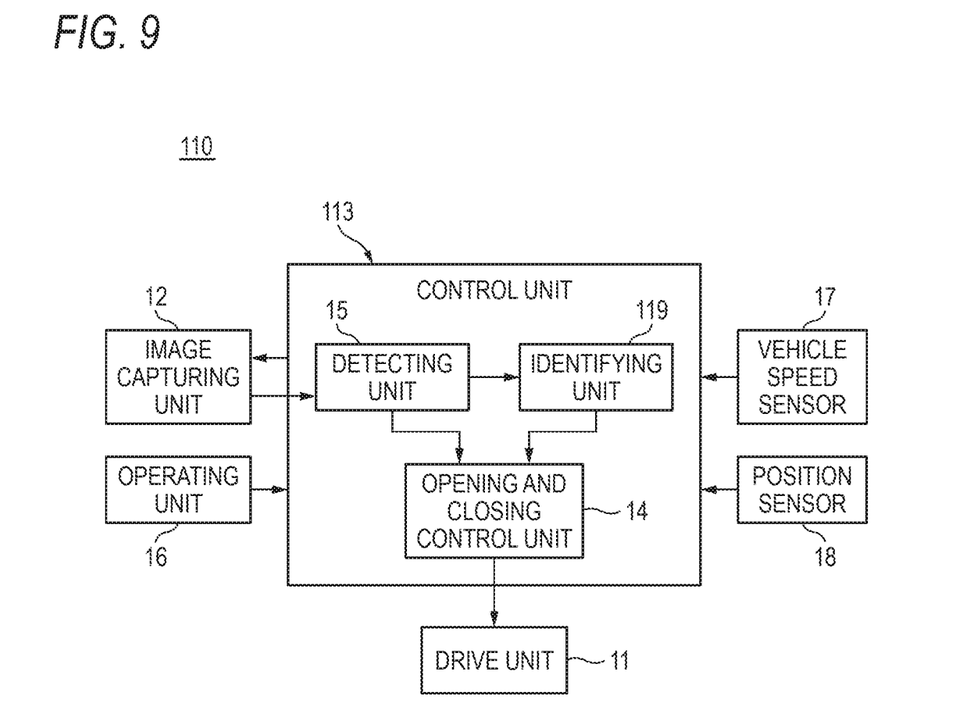
FIG. 9 is a functional block diagram of an opening and closing system installed to the vehicle shown in FIG. 7 to describe a modified example of the invention.

FIG. 9 shows a functional block diagram of another example of an opening and closing system to describe the illustrative embodiment of the invention. Incidentally, the same reference numerals will be are assigned to elements common to those of the above-described opening and closing system 10, and the description thereof will be simplified or omitted.

An opening and closing system 110 shown in FIG. 9 is installed to the vehicle 1A shown in FIG. 2 to open and close automatically the door 2A which is the swing door. However, the opening and closing system 10 may be installed to the vehicle 1B shown in FIG. 7 to open and close the door 2B which is the sliding door.

This opening and closing system 110 includes a drive unit 11, an image capturing unit 12 and a control unit 113. The drive unit 11 includes a motor, or the like, and drives the door 2A to be opened or closed. The image capturing unit 12 captures an image of a periphery of the door 2A. The control unit 113 functions as an opening and closing control unit 14 and a detecting unit 15. The opening and closing control unit 14 operates according to a control program so as to control the drive unit 11 to open or close the door 2A. The detecting unit 15 detects an obstacle proximity to the door 2A on the track of the door 2A. The control unit 13 also functions as an identifying unit 119 which identifies whether the detected obstacle is a human body or not. Then, the opening and closing control unit 14 is configured to control the opening and closing of the door based on the results of the detection of the obstacle by the detecting unit 15 and the results of the identification of the obstacle by the identifying unit 119.

The identification of the human body by the identifying unit 119 includes the identification of a specific part of the human body such as a head portion or a hand, for example. In identifying the human body, a method can be used in which the human body or a specific part of the human body is identified from an image by making use of features of the shape of a human body such as an HOG (Histogram of Oriented Gradient) features.

Figure 10:
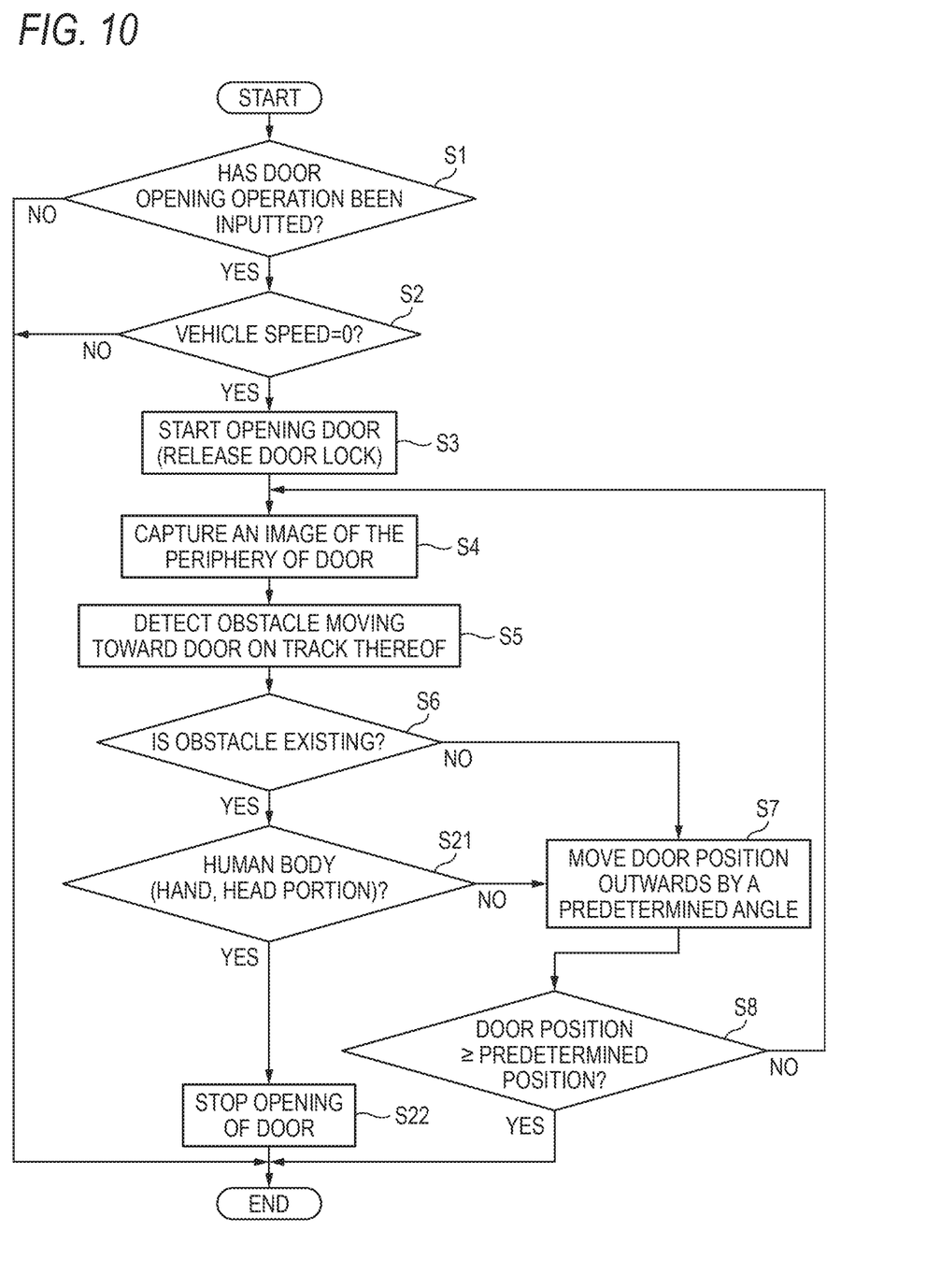
FIG. 10 is a flowchart of the door opening operation carried out by the opening and closing system shown in FIG. 9.

FIG. 10 shows operations performed by the opening and closing system 110 when the door 2A is opened.

A door opening operation carried out by the opening and closing system 110 shown in FIG. 10 differs from the door opening operation carried out by the opening and closing system 10 shown in FIG. 4 in the operations carried out after the detection of the obstacle proximity to the door 2A on the opening track of the door 2A when the obstacle is really detected. Hereinafter, the different operations carried out by the opening and closing system 110 will be described.

When an obstacle is detected by the detecting unit 15 (step S6: Yes), the identifying unit 119 of the control unit 13 identifies whether the detected obstacle is a human body or not (step S21).

When the identifying unit 119 identifies the obstacle as a human body as a result of the identifying operation in step S21 (step S21: Yes), the opening and closing control unit 14 of the control unit 13 outputs a stop control signal to the drive unit 11 to cause the drive unit 11 to stop the opening of the door 2A and to hold the position of the door 2A (step S22) and ends the door opening operation.

On the other hand, when the identifying unit 119 identifies the obstacle as an object other than a human body as a result of the identifying operation in step S21 (step S21: No), the opening and closing control unit 14 of the control unit 13 outputs a door opening control signal to the drive unit 11 to cause the drive unit 11 to move the door 2A outwards by a predetermined angle to open the door 2A (step S7).

A door closing operation of the opening and closing system 110 will similarly be performed. When the detecting unit 15 detects an obstacle proximity to the door 2A on the track of the door 2A, if the identifying unit 119 identifies the detected obstacle as a human body, the control unit 13 stops the door 2A before the door 2A comes into contact with the obstacle; whereas if the identifying unit 119 identifies the detected obstacle as an object other than a human body, the control unit 13 closes the door 2A.

Incidentally, if the obstacle is identified as a moving object such as a passenger who is getting into or getting out of the vehicle 1A, 1B, the contact of the door 2A, 2B with the obstacle may be avoided as a result of the movement of the obstacle. Thus, the above-described opening and closing system 10 and the opening and closing system 110 may be configured to, if an obstacle is detected on the track of the door 2A, 2B, perform a deceleration control of decelerating the door 2A, 2B which is being opened or closed before the door 2A, 2B being stopped from being opened or closed to allow the obstacle (the moving object) to pass through the track of the door 2A, 2B.

What is claimed is:

1. An opening and closing system, comprising:
a drive unit configured to drive a closing openable member to be opened or closed, the closing openable member being provided in an opening portion of a vehicle;
an opening and closing control unit configured to control the drive unit to open or close the closing openable member;
an image capturing unit comprising a camera disposed on the closing opening member, the image capturing unit configured to capture an image of a periphery of the closing openable member;
a detecting unit configured to detect an obstacle proximate to the closing openable member based on the image captured by the image capturing unit, wherein the detecting comprises extracting an image from the captured image through image analysis and calculating a direction of and a distance to the obstacle relative to the image capturing unit; and
an identifying unit configured to identify whether the obstacle detected by the detecting unit is a human body,
wherein the opening and closing control unit is further configured to:
in response to the obstacle being detected by the detecting unit, control the identifying unit to identify whether the obstacle detected by the detecting unit is the human body;
in response to the detected obstacle being identified as the human body, stop the closing openable member before the closing openable member comes into contact with the obstacle; and
in response to the detected obstacle being identified as not the human body, move the closing openable member outwards by a predetermined angle.

2. The opening and closing system according to claim 1, wherein the opening and closing control unit is configured to stop the closing openable member moving in a first direction before the closing openable member comes into contact with the obstacle and to cause the closing openable member to move in a second direction after the opening and closing control unit has stopped the closing openable member, the second direction being opposite to the first direction in which the closing openable member moved before the closing openable member was stopped.

3. The opening and closing system according to claim 2, wherein when the second direction is an opening direction, the opening and closing control unit is configured to fully open the closing openable member.

4. The opening and closing system according to claim 1, wherein the detecting unit is configured to:
extract an object from the image captured by the image capturing unit;
determine whether or not the object is positioned on a track of the closing openable member;
calculate a distance between the object, which is positioned on the track of the closing openable member, and the closing openable member; and
when it is determined that the object is positioned on the track of the closing openable member and the distance between the object and the closing openable member is less than a threshold, detect said object as the obstacle proximate to the closing openable member.

5. The opening and closing system according to claim 1, wherein:
the image capturing unit comprises a stereocamera configured to capture a parallax image of the periphery of the closing openable member,
the detecting unit is configured to detect the obstacle proximate to the closing openable member based on the parallax image captured by the image capturing unit, and
calculating the direction of and the distance to the obstacle relative to the image capturing unit is performed using the captured parallax image and the principle of trigonometrical survey.

6. The opening and closing system according to claim 5, wherein the stereocamera comprises a first camera disposed on a first of the closing openable member and a second camera disposed on a second side of the closing openable member opposite to the first side.

7. The opening and closing system according to claim 1, wherein:
the image capturing device comprises a monocular camera configured to capture a plurality of images of the periphery of the closing openable member at predetermined time intervals,
the detecting unit is configured to detect the obstacle proximate to the closing openable member based on the plurality of images captured by the image capturing unit, and
the detecting comprises extracting an image from the captured plurality of images through image analysis and calculating a direction of and a distance to the obstacle relative to the image capturing unit based on a movement of the object in the plurality of images and based on a displacement of the monocular camera.

8. An opening and closing system, comprising:
a drive device configured to drive a closing openable member to be opened or closed, the closing openable member being provided in an opening portion of a vehicle;
an image capturing device comprising a camera disposed on the closing opening member, the image capturing device configured to capture an image of a periphery of the closing openable member; and
a controller configured to:
control the drive device to open or close the closing openable member;
detect an obstacle proximate to the closing openable member based on the image captured by the image capturing device, wherein the detecting comprises extracting an image from the captured image through image analysis and calculating a direction of and a distance to the obstacle relative to the image capturing device;
in response to the obstacle being detected, identify whether the detected obstacle is a human body;
in response to the detected obstacle being identified as the human body, stop the closing openable member before the closing openable member comes into contact with the obstacle; and
in response to the detected obstacle being identified as not the human body, move the closing openable member outwards by a predetermined angle.

9. The opening and closing system according to claim 8, wherein the controller is configured to stop the closing openable member moving in a first direction before the closing openable member comes into contact with the obstacle and to cause the closing openable member to move in a second direction after the controller has stopped the closing openable member, the second direction being opposite to the first direction in which the closing openable member moved before the closing openable member was stopped.

10. The opening and closing system according to claim 9, wherein when the second direction is an opening direction, the controller is configured to fully open the closing openable member.

11. The opening and closing system according to claim 8, wherein the controller is configured to:
  extract an object from the image captured by the image capturing device;
  determine whether or not the object is positioned on a track of the closing openable member;
  calculate a distance between the object, which is positioned on the track of the closing openable member, and the closing openable member; and
  when it is determined that the object is positioned on the track of the closing openable member and the distance between the object and the closing openable member is less than a threshold, detect said object as the obstacle proximate to the closing openable member.

12. The opening and closing system according to claim 8, wherein:
  the image capturing device comprises a stereocamera configured to capture a parallax image of the periphery of the closing openable member,
  the controller is configured to detect the obstacle proximate to the closing openable member based on the parallax image captured by the image capturing device, and
  calculating the direction of and the distance to the obstacle relative to the image capturing device is performed using the captured parallax image and the principle of trigonometrical survey.

13. The opening and closing system according to claim 12, wherein the stereocamera comprises a first camera disposed on a first of the closing openable member and a second camera disposed on a second side of the closing openable member opposite to the first side.

14. The opening and closing system according to claim 8, wherein:
  the image capturing device comprises a monocular camera configured to capture a plurality of images of the periphery of the closing openable member at predetermined time intervals,
  the controller is configured to detect the obstacle proximate to the closing openable member based on the plurality of images captured by the image capturing device, and
  the detecting comprises extracting an image from the captured plurality of images through image analysis and calculating a direction of and a distance to the obstacle relative to the image capturing device based on a movement of the object in the plurality of images and based on a displacement of the monocular camera.

* * * * *